No. 788,146. PATENTED APR. 25, 1905.
D. SHARMAN.
WHEELED VEHICLE.
APPLICATION FILED AUG. 26, 1904.

WITNESSES:
Wm H Caufield
Clotilda Schweiger

INVENTOR.
David Sharman,
BY
W. B. Hutchinson.
ATTORNEY.

No. 788,146. Patented April 25, 1905.

UNITED STATES PATENT OFFICE.

DAVID SHARMAN, OF BRANDON, CANADA.

WHEELED VEHICLE.

SPECIFICATION forming part of Letters Patent No. 788,146, dated April 25, 1905.

Application filed August 26, 1904. Serial No. 222,261.

*To all whom it may concern:*

Be it known that I, DAVID SHARMAN, of Brandon, Manitoba, Canada, have invented a new and useful Improvement in Wheeled Vehicles, of which the following is a full, clear, and exact description.

My invention relates to improvements in wheeled vehicles; and the object of my invention is to produce a simple and easy spring attachment by means of which the up-and-down movement of the vehicle-body will be transmitted to horizontally-compressing springs by means of a gear mechanism which provides for great resiliency and freedom of movement.

The invention is illustrated in the accompanying views, in which—

Figure 1:
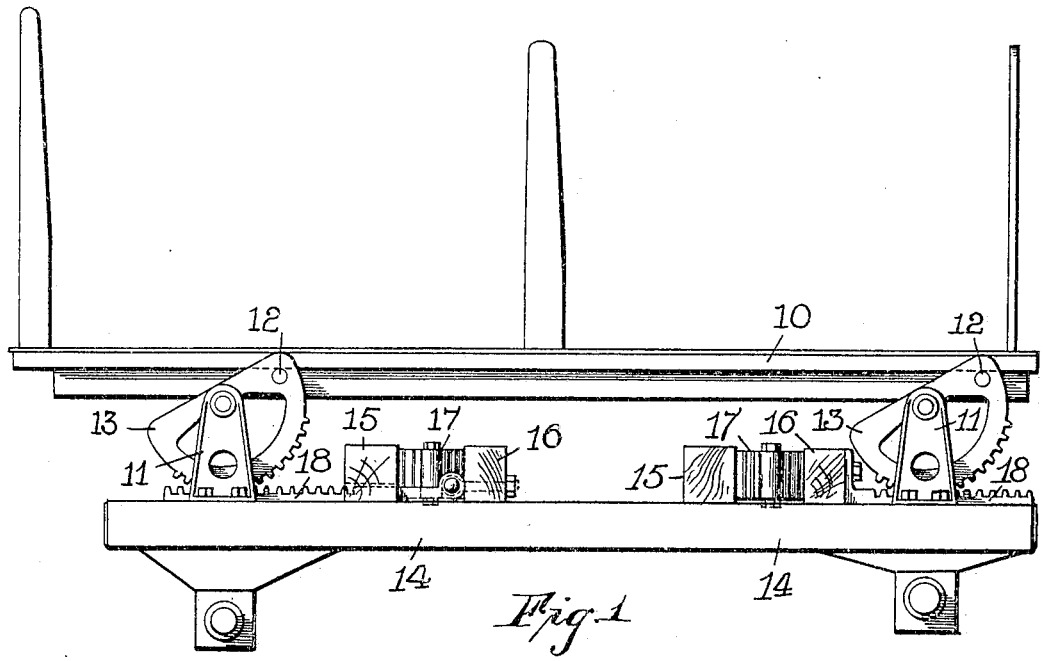
Figure 2:
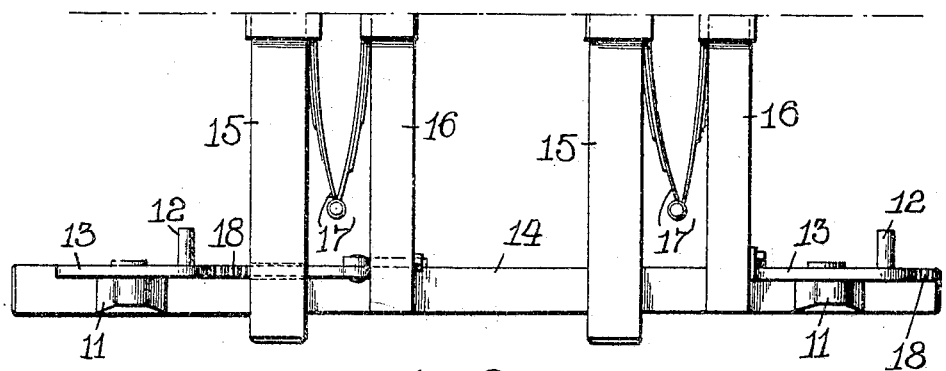

Figure 1 is a side view of the frame of a vehicle with the wheels removed; and Fig. 2 is a plan view of the same, showing one-half of it.

In the drawings, 10 is a platform or body of the vehicle or wagon and is arranged to rest on the pins 12 on the segmental gears 13, which in turn are fixed in the supports 11 on the stringer 14. Running across the machine are the cross-beams 15, which are fast to the stringers 14, and another set of cross-beams, 16, are arranged to slide on the top of the stringers 14, and springs 17 between the cross-beams 15 and 16 tend to normally throw them apart. The racks 18 are secured to the movable cross-beams 16, and the teeth on them are in mesh with the teeth in the segmental gear 13.

Now it will be seen that any weight placed on the wagon will actuate the gear, the rack, and the springs to press against the cross-beams 15. When the vehicle is put into motion by means of a horse or other power, the up-and-down motion of the body of the vehicle caused by unevenness in the roadway will tend to operate the springs in a horizontal direction, and thus a very easy and resilient spring action is provided.

Having thus fully described my invention, I claim as new and desire to secure by Letters Patent—

1. A wheeled vehicle, comprising a frame, springs secured to the frame and disposed to extend and compress horizontally, cross-beams acting on the springs, racks arranged to slide with the cross-beams, gears arranged in mesh with the racks, studs projecting inwardly from the gears, and a body arranged to rest on the studs.

2. A vehicle comprising a frame, horizontally-moving springs supported by the frame, sliding racks supported on the frame and connected operatively to the springs, gears supported on the frame in mesh with the racks, and a body pivoted to the gears off their supporting-axes.

DAVID SHARMAN.

Witnesses:
G. B. COLEMAN,
P. HARTNEY.